Patented Dec. 30, 1941

2,267,735

UNITED STATES PATENT OFFICE 2,267,735

MANUFACTURE OF CATALYSTS

Vladimir N. Ipatieff and Ben B. Corson, Chicago, Ill., assignors to Universal Oil Products Company, Chicago, Ill., a corporation of Delaware No Drawing. Application March 31, 1939, Serial No. 265,136

6 Claims. (Cl. 252—253)

This invention relates to the manufacture of a particular type of catalyst which has been found specially effective in the hydrogenation of normally liquid monoolefins to produce the corresponding paraffin hydrocarbons therefrom although it can be employed also in other types of hydrogenation reactions.

It is recognized that the use of catalysts in hydrogenation reactions is an art of long standing and that many catalysts have been developed which are effective in promoting specific hydrogenation reactions involving only single chemical compounds, mixtures of unsaturated compounds, or related groups In general the most active catalysts for effecting hydrogenation reactions involving the direct nondestructive addition of hydrogen to hydrocarbons have been the metals prepared by the reduction of their oxides such as, for example, iron, nickel, and copper, although in many well-known instances the use of these particularly active catalysts is limited by the fact that they are specially sensitive to oxidation or sulfuration and have, therefore, a limited active catalyst life. For this reason many attempts have been made to utilize less active but more rugged catalytic materials which are not sensitive to the poisoning influences of oxygen, sulfur, and other interfering substances.

In one specific embodiment the present invention comprises a process for preparing metal and particularly nickel catalysts involving the following series of steps: (1) impregnating a refractory support with a water soluble metal salt; (2) drying the impregnated material; treating the dried material with ammonia and hydrogen or with ammonia, hydrogen and a moist oxygen-containing gas.

The hydrogenation catalyst formed by the specific series of steps set forth comprises granular material of high catalytic activity and relatively long active life but with relatively low cost of manufacture. It is obvious that the composition of the catalyst may be varied within reasonable limits without departing from the scope of the invention.

The general method of catalyst preparation according to the process of this invention involves the following steps: A refractory support or carrier such as alumina, fuller's earth, diatomaceous earth, granular pumice, crushed firebrick, quartz chips, porous plate chips, etc., is mixed with a metal salt or an aqueous solution thereof so as to soak into or impregnate the carrier. In the preparation of a nickel catalyst the preferred salts used for coating or soaking of the desired carrier comprise nickel chloride and nickel sulfate which are generally less expensive than nickel nitrate, a material likewise usable in catalyst manufacture. Such coating or impregnation of a carrier by a nickel salt may also be effected by mixing the carrier with the nickel salt, followed by heating whereby the salt melts and/or dissolves in the water of crystallization which is usually sufficient to satisfactorily wet and penetrate the carrier being employed.

A carrier coated or impregnated by a metal salt or a nickel salt, as indicated above, or by another suitable method is then dried to produce a powdered or granular material depending upon the form of the carrier originally used. Such powdered and dried material may then be pelleted or otherwise formed into particles of size and shape suitable for use as a filler for reactors used in hydrocarbon conversion reactions. Formed catalyst particles may also be produced by pelleting or extruding a powdered mixture of carrier and metal salt. The formed particles or granular material may then be treated in the third step of the process of the present invention by contact with ammonia, air, and hydrogen whereby to produce catalytically active material.

When using a carrier and a metal chloride as nickel chloride the third step in the preparation of an active catalyst may be effected by treatment with ammonia, or with ammonia and hydrogen in admixture or alternately, at a temperature in the approximate range of 550–1,200° F. By this treatment the chloride content of nickel chloride is converted into ammonium chloride which is volatilized from the composite catalytic material and may be collected by suitable means, if desired. The reaction occurring in this step of the process may be represented by the following equation:

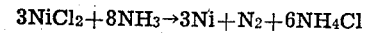

$$3NiCl_2 + 8NH_3 \rightarrow 3Ni + N_2 + 6NH_4Cl$$

For the production of catalytically active metal, and particularly nickel, from a metal sulfate according to the process of the present invention the removal of sulfur is often effected preferably by mixing hydrogen with ammonia to assist in the reduction and to carry from the reaction vessel the ammonium sulfite produced. Treatment of a nickel sulfate impregnated carrier with ammonia or with a mixture of ammonia and hydrogen should be alternated with oxidation by moist air at a temperature in the approximate range of 550–1,200° F. or by another oxygen-containing gas until complete conversion of nickel sulfate to metallic nickel has occurred, or a mixture of ammonia and moist air may be employed to effect this conversion. The reason that treatments with ammonia and a moist oxygen-containing gas should be repeated alternately is that nickel sulfate undergoes two simultaneous reactions in the presence of ammonia to give nickel and nickel sulfide. The residual nickel sulfide must be oxidized to nickel sulfate which in turn is decomposed with ammonia. The desired reactions involved when nickel sulfate is treated with a mixture of hydrogen and ammonia may be represented by the following equation:

$$NiSO_4 + 2H_2 + 2NH_3 \rightarrow Ni + (NH_4)_2SO_3 + H_2O$$

As indicated in the above equation, the sulfate content is removed as ammonium sulfite during the preparation of active nickel from nickel sulfate used in the coating or impregnating of the refractory supports previously indicated.

Preparation of catalytic materials according to the process of the present invention avoids troublesome and expensive precipitation and washing procedures involved in some other methods. This invention also makes it possible to prepare a supported or impregnated catalyst, free from injurious contamination by compounds of chlorine and/or sulfur, from relatively cheap nickel chloride and/or nickel sulfate rather than from the more expensive nickel nitrate frequently employed for the preparation of similar catalysts by methods involving precipitation of hydrated nickel oxides.

It is to be understood that catalysts prepared from the various materials with the ranges of proportions indicated may differ in catalytic activity as well as in other properties. Also, the different catalysts are not necessarily equivalent nor may they always be used alternatively, but in any case a catalyst is chosen with an activity suitable to the reaction involved.

While the process of this invention is directed to the preparation of granular catalytic material, it is likewise applicable to the production of similar powdered material consisting of a reduced metal and a suitable refractory carrier, support, or spacing agent.

The following examples are given to show the type of results normally obtainable in the operation of the process of the present invention, although not with the intention of limiting unduly its proper scope:

*Example I*

Ninety parts by weight of 8–14 mesh activated alumina was impregnated with an aqueous solution of nickel chloride after which the material was dried at 260° F. for three hours. This dried material containing 25% by weight of nickel chloride was heated at 750° F. in a stream of equal volumes of gaseous ammonia and hydrogen for six hours under ordinary pressure. During this treatment 99.5% of the original chloride content was expelled and collected quantitatively as ammonium chloride. The residual granular material, found by analysis to contain 0.5% of the original chlorine content, was an effective catalyst for hydrogenating to isomeric octanes a mixture of octenes formed by catalytic polymerization of butenes.

*Example II*

A mixture of 49.1% by weight of nickel sulfate hexahydrate and 50.9% of granular alumina was dried at 275° F. to remove water. For periods of one-half hour each moist oxygen and ammonia were alternately passed over this dried material heated at 1,050° F. for a total time of nine hours. During the periods when ammonia was being passed the exit gas was found to be 97% nitrogen. By this treatment 98.2% of the original sulfur content was eliminated mainly as ammonium sulfite, the remaining 1.8% of the original sulfur being present in the final catalyst as nickel sulfate which was without substantial influence on the catalytic properties of the nickel catalyst. As finally produced, the catalytic material consisting of active nickel supported by the alumina carrier was found to be effective in the hydrogenation of octenes to octanes.

The character of the process of the present invention, and particularly its commercial value, are evident from the preceding specification and limited numerical data, although neither section is intended to limit its generally broad scope.

We claim as our invention:

1. A process for preparing a reduced nickel hydrogenation catalyst which comprises impregnating a refractory support with nickel sulfate, heating to remove water, and treating alternately with ammonia and a moist oxygen-containing gas at a temperature within the approximate range of 550–1,200° F. until a reduced nickel substantially free of sulfate is produced.

2. A process for preparing a reduced nickel hydrogenation catalyst which comprises impregnating a refractory support with nickel sulfate, heating to remove water, and treating alternately with a mixture of ammonia and hydrogen and with a moist oxygen-containing gas at a temperature within the approximate range of 550–1,200° F. until a reduced nickel substantially free of sulfate is produced.

3. A process for preparing a reduced nickel hydrogenation catalyst which comprises impregnating a refractory support with nickel sulfate, heating to remove water, and treating alternately with ammonia and moist air at a temperature within the approximate range of 550–1,200° F. until a reduced nickel substantially free of sulfate is produced.

4. A process for preparing a reduced nickel hydrogenation catalyst which comprises impregnating a refractory support with nickel sulfate, heating to remove water, and treating alternately with a mixture of ammonia and hydrogen and with moist air at a temperature within the approximate range of 550–1,200° F. until a reduced nickel substantially free of sulfate is produced.

5. A process for preparing a reduced nickel hydrogenation catalyst which comprises impregnating a refractory support with nickel sulfate, heating to remove water, and treating alternately with ammonia and moist oxygen at a temperature within the approximate range of 550–1,200° F. until a reduced nickel substantially free of sulfate is produced.

6. A process for preparing a reduced nickel hydrogenation catalyst which comprises impregnating a refractory support with nickel sulfate, heating to remove water, and treating alternately with a mixture of ammonia and hydrogen and with moist oxygen at a temperature within the approximate range of 550–1,200° F. until a reduced nickel substantially free of sulfate is produced.

VLADIMIR N. IPATIEFF.
BEN B. CORSON.